Patented July 22, 1924.

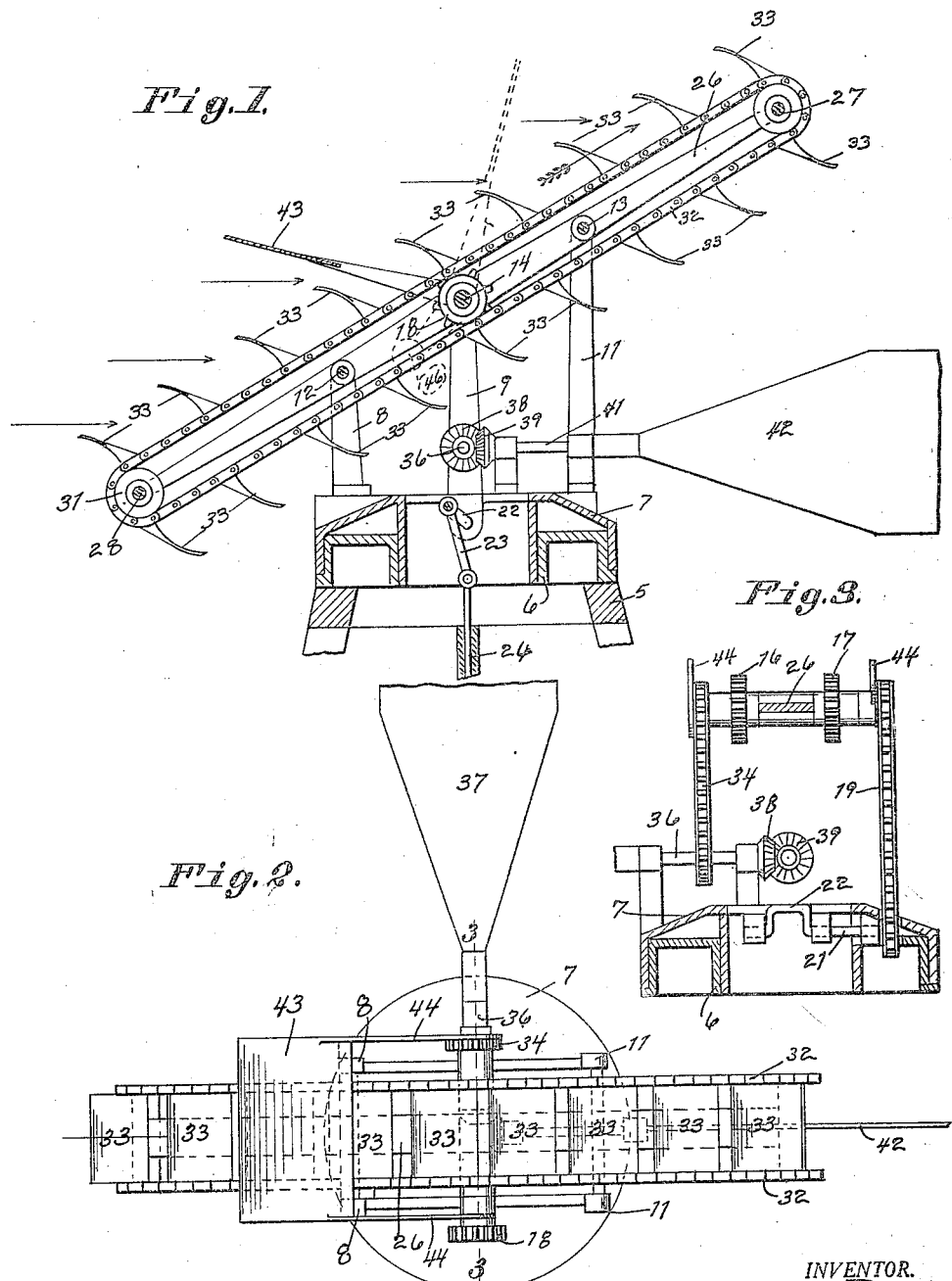

1,502,296

UNITED STATES PATENT OFFICE.

JAMES S. DOAK, OF GLENN, CALIFORNIA.

FLUID-CURRENT MOTOR.

Application filed May 2, 1923. Serial No. 636,191.

*To all whom it may concern:*

Be it known that I, JAMES S. DOAK, a citizen of the United States, residing at Glenn, in the county of Glenn and State of California, have invented new and useful Improvements in Fluid-Current Motors, of which the following is a specification.

This invention relates to improvements in fluid current motors of the type commonly known as wind-mills.

The principal object of this invention is to provide a series of vanes adapted to be contacted by the wind for a considerable period of time, in counter-distinction to the ordinary wind-mill where the wind passes through the blades and contacts them for a moment.

Another object is to provide a device which will automatically face into the wind except when the wind is in access or approaching storm velocity, at which time the propelling element is turned so that the wind has no effect thereon.

A still further object is to provide a device of this character which is simple in construction, and one which will be quiet in operation and one which will present a neat appearance.

Other objects and advantages will be apparent during the course of the following description.

In the accompanying drawings forming a part of this specification, and in which like numerals are employed to designate like parts throughout the same, Figure 1 is a side elevation partly broken away to better illustrate the mechanism thereof, Figure 2 is a top plan view of my device, and Figure 3 is a cross section taken on the line 3—3 of Figure 2.

Wind-mills of the rotating type are of such a construction that the wind contacting the blades does so during a very short period. In other words, the blades screw through the air. It is my object to provide a plurality of impellers which travel with the wind thereby receiving the force therefrom for a considerable period and converting this force into power.

In the accompanying drawings wherein for the purpose of illustration is shown a preferred embodiment of my invention, the numeral 5 designates the base of a tower or other suitable support. This base is provided with a head 6 upon which is mounted a turn-table 7. This turn-table has mounted thereon a plurality of upwardly extending supports as shown at 8, 9 and 11. The support 8 being shorter than the support 11. It is of course understood that there are two sets of these supports spaced one from the other as shown in Figure 2. Extending between the supports 8 is a rigid shaft 12, while extending between the supports 11 is a rigid shaft 13.

A rotatable shaft 14 extends between the supports 9 and has keyed thereto sprockets 16 and 17. A sprocket 18 is mounted upon the end of the shaft 14 and is adapted to be connected through a chain 19 to a sprocket mounted therebelow upon a shaft 21 having a crank 22 formed therein. This crank is journaled upon the turn-table 7 and has a connecting rod 23 extending downwardly to an operating link 24 which transmits power to a distant point.

At 26 I have shown a spreader which is mounted upon the shafts 13, 14 and 12 and carries shafts 27 and 28 at its extremities. Mounted upon the ends of these last mentioned shafts are suitable pulleys as shown at 29 and 31 over which a chain belt 32 is adapted to pass. This chain belt is provided with a series of impellers as shown at 33 and it will be noted that the same are curved as shown in Figure 1.

Loosely mounted upon the shaft 14 is a sprocket over which a chain 34 passes which chain extends downwardly and to a sprocket mounted upon a shaft 36. This shaft 36 carries a vane 37 at its outer end and has a bevel gear 38 secured to its opposite end. This gear meshes with a similar bevel gear 39 mounted upon a shaft 41 which shaft is provided with a vane 42.

At 43 I have shown a controlling vane which vane is mounted upon arms 44 freely journaled upon the shaft 14 and connected to a sprocket over which the chain 34 passes. A counter-weight shown in dotted lines in Figure 1 and bearing the numeral 46 serves to normally maintain the controlling vane 43 in its full line position of Figure 1, the same moving to the dotted line position only when the velocity of the wind becomes excessive.

The operation of my device is as follows:—

Assuming that the parts are arranged as shown in Figure 1 and that the wind is proceeding in the direction of the arrows, the impellers upon the upper side will receive the force of the wind thus imparting movement to the chains 32 which will transmit power through the engagement of these chains with the sprockets 16 and 17. This motion will be transmitted through the chain 19 to the crank 22 and thence through the connecting rod 23 and operating link 24 to the point of use.

The vane 42 will tend to keep the device headed into the wind until the wind reaches a velocity sufficient to move the controlling vane 43 against the action of the counterweight 46. As soon as this vane moves to its dotted line position, motion will be transmitted through the chain 44 to the shaft 36. This will turn the vane 37 from its edge-wise position with respect to the wind to the full surface position and at the same time through the action of the gears 38 and 39 the vane 42 will be turned through an arc of 90° so that it will present its edge to the wind, with the result that the turn-table 7 will be caused to rotate so as to present the edges of the propellers to the wind rather than the flat surface.

It will thus be seen that I have provided a device which is simple in construction and one which will be efficient in operation.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. In a device of the character described, a support, a turn-table mounted on said support, a plurality of upwardly extending supports mounted on said turn-table, said last mentioned supports being of varying length, a spreader extending between said supports and extending beyond the same, pulleys carried upon the ends of said spreader, chains passing over said pulleys, a plurality of impellers secured to said chain, means for imparting motion from said chains to a remote point, a shaft positioned between said chains, a freely rotatable sprocket mounted on said shaft, a controlling vane rotatable on said shaft and secured to said sprocket, a vane secured to said turn-table and adapted to normally maintain said impellers toward the direction of travel of the wind, a second vane positioned at right angles to said first mentioned vane and adapted to normally have its edge presented toward the direction of travel of the wind, gears connecting said vanes so as to produce simultaneous rotation of said vanes, a sprocket connected to one of said vanes and a chain extending between said freely rotatable sprocket and said last mentioned sprocket for the purpose specified.

2. In a device of the character described, a turn-table, a plurality of upwardly extending supports mounted on said turn-table, an inclined spreader extending between said supports, pulleys carried on the ends of said spreader, chains positioned between said pulleys and adapted to rotate thereover, a plurality of impellers secured to said chains, a vane positioned below said spreader and in parallel alignment therewith, a second vane positioned at right angles to said first mentioned vane, gears connecting said vanes so as to impart simultaneous movement to said vanes, a controlling vane mounted above said spreader and means for imparting movement from said controlling vane to said first and second mentioned vanes for the purpose of rotating said vanes through an angle of 90° for the purpose specified.

In testimony whereof I affix my signature.

JAMES S. DOAK.